(12) United States Patent
Fletcher et al.

(10) Patent No.: US 7,660,296 B2
(45) Date of Patent: Feb. 9, 2010

(54) RELIABLE, HIGH-THROUGHPUT, HIGH-PERFORMANCE TRANSPORT AND ROUTING MECHANISM FOR ARBITRARY DATA FLOWS

(75) Inventors: Gregory Fletcher, Boston, MA (US); Andrew F. Champagne, Ware, MA (US); Daniel Stodolsky, Somerville, MA (US); Michael M. Afergan, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 190 days.

(21) Appl. No.: 11/323,342

(22) Filed: Dec. 30, 2005

(65) Prior Publication Data

US 2007/0153782 A1     Jul. 5, 2007

(51) Int. Cl.
*H04L 12/28* (2006.01)
(52) U.S. Cl. .................. 370/352; 370/409
(58) Field of Classification Search .......... 370/230, 370/338, 349, 389, 465, 351, 397, 409; 709/223, 709/225, 229; 707/100
See application file for complete search history.

(56) References Cited

U.S. PATENT DOCUMENTS 5,734,719 A * 3/1998 Tsevdos et al. ............. 700/234
5,774,668 A * 6/1998 Choquier et al. ............ 709/223
7,162,529 B2 * 1/2007 Morishige et al. ........... 709/230
7,328,237 B1 * 2/2008 Thubert et al. .............. 709/203
2002/0055983 A1 * 5/2002 Goddard .................... 709/217
2002/0069278 A1 * 6/2002 Forslow .................... 709/225
2002/0107940 A1 * 8/2002 Brassil ...................... 709/219
2003/0135509 A1 * 7/2003 Davis et al. ................ 707/100
2003/0188021 A1 * 10/2003 Challenger et al. .......... 709/246
2004/0267945 A1 * 12/2004 Reiss ........................ 709/229

\* cited by examiner

*Primary Examiner*—Kwang B Yao
*Assistant Examiner*—Andrew Lai
(74) *Attorney, Agent, or Firm*—David H. Judson

(57) ABSTRACT

The present invention leverages an existing content delivery network infrastructure to provide a system that enhances performance for any application that uses the Internet Protocol (IP) as its underlying transport mechanism. An overlay network comprises a set of edge nodes, intermediate nodes, and gateway nodes. This network provides optimized routing of IP packets. Internet application users can use the overlay to obtain improved performance during normal network conditions, to obtain or maintain good performance where normal default BGP routing would otherwise force the user over congested or poorly performing paths, or to enable the user to maintain communications to a target server application even during network outages.

9 Claims, 8 Drawing Sheets

RELIABLE, HIGH-THROUGHPUT, HIGH-PERFORMANCE TRANSPORT AND ROUTING MECHANISM FOR ARBITRARY DATA FLOWS

BACKGROUND OF THE INVENTION

1. Technical Field

The present invention relates generally to data packet transport and routing over the Internet.

2. Brief Description of the Related Art

The public Internet is increasingly being used by enterprises for a variety of mission-critical applications such as transactions for e-commerce, inter-office connectivity over virtual private networks (VPNs), and most recently, for web services as a new paradigm for developing distributed applications. The current Border Gateway Protocol (BGP) based Internet routing infrastructure, however, is inadequate to support the reliability and performance needs of these applications. In particular, Internet routing, largely determined by the BGP protocol, has several weaknesses. First, BGP uses a metric known as shortest AS (Autonomous System) path length to determine a next hop for a packet. FIG. 1A shows that BGP will route data from Network A destined for Network D directly, because the AS path length is one. This is not always desirable, as it has been shown that BGP is slow to converge. Thus, if a link between two networks becomes unavailable, it can take seconds to several minutes before all relevant routers become aware and can route around the problem. During this time, packets will be lost. Furthermore, as illustrated in FIG. 1B, peering policies may dictate that a network should not accept packets from another network; BGP cannot efficiently route around this problem. Another problem is that different Internet applications require different characteristics (e.g., minimal loss, latency, or variability in latency) of an end-to-end connection for optimal performance. BGP makes no effort to route for quality of service and has no notion of any of these metrics. As illustrated in FIG. 2, BGP will choose a route (between Networks A and D) with larger latency than alternative routes.

There is a need in the art for intelligent routing as businesses increasingly rely on the Internet for such applications as Web transactions, virtual private networks (VPNs) and Web Services. The notion of intelligent routing based on measurements of real time network conditions is known in the art, e.g., such as the product offerings by RouteScience and other companies. These products, however, only have an ability to control only the first hop of the outbound route, namely, by injecting appropriate directives into the router. Attempts to control the inbound route, e.g., by affecting BGP advertisements, are limited by the low frequency with which these advertisements can be changed, the coarse granularity of the advertisements, the requirement of cooperation from multiple routers on the Internet, and the ubiquity of policy overrides by several ISPs.

Distributed computer systems also are well-known in the prior art. One such distributed computer system is a "content delivery network" or "CDN" that is operated and managed by a service provider. The service provider may provide the service on its own behalf, or on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, request routing, provisioning, data monitoring and reporting, content targeting, personalization, and business intelligence. The term "outsourced site infrastructure" means the distributed systems and associated technologies that enable an entity to operate and/or manage a third party's Web site infrastructure, in whole or in part, on the third party's behalf.

A known distributed computer system is assumed to have a set of machines distributed around the Internet. Typically, most of the machines are servers located near the edge of the Internet, i.e., at or adjacent end user access networks. A Network Operations Command Center (NOCC) may be used to administer and manage operations of the various machines in the system. Third party sites, such as Web site, offload delivery of content (e.g., HTML, embedded page objects, streaming media, software downloads, and the like) to the distributed computer system and, in particular, to "edge" servers. End users that desire such content may be directed to the distributed computer system to obtain that content more reliably and efficiently. Although not shown in detail, the distributed computer system may also include other infrastructure, such as a distributed data collection system that collects usage and other data from the edge servers, aggregates that data across a region or set of regions, and passes that data to other back-end systems to facilitate monitoring, logging, alerts, billing, management and other operational and administrative functions. Distributed network agents monitor the network as well as the server loads and provide network, traffic and load data to a DNS query handling mechanism, which is authoritative for content domains being managed by the CDN. A distributed data transport mechanism may be used to distribute control information (e.g., metadata to manage content, to facilitate load balancing, and the like) to the edge servers. As illustrated in FIG. 3, a given machine 300 comprises commodity hardware (e.g., an Intel Pentium processor) 302 running an operating system kernel (such as Linux or variant) 304 that supports one or more applications 306a-n. To facilitate content delivery services, for example, given machines typically run a set of applications, such as an HTTP Web proxy 307, a name server 308, a local monitoring process 310, a distributed data collection process 312, and the like.

Content delivery networks such as described above also may include ancillary networks or mechanisms to facilitate transport of certain data or to improve data throughput. Thus, an Internet CDN may provide transport of streaming media using information dispersal techniques whereby a given stream is sent on multiple redundant paths. One such technique is described in U.S. Pat. No. 6,751,673, titled "Streaming media subscription mechanism for a content delivery network," assigned to Akamai Technologies, Inc. The CDN may also provide transport mechanisms to facilitate communications between a pair of hosts, e.g., two CDN servers, or a CDN edge server and a customer origin server, based on performance data that has been collected over time. A representative HTTP-based technique is described in U.S. Published Patent Application 2002/0163882, titled "Optimal route selection in a content delivery network," also assigned to Akamai Technologies, Inc.

BRIEF SUMMARY OF THE INVENTION

It is an object of the present invention to provide a reliable, high-throughput, high-performance transport and routing mechanism for arbitrary data flows.

It is another object of the invention to provide an overlay on top of the Internet that routes data around problems in the Internet to find a best service route or a path with minimal latency and loss.

It is still another object of the invention to leverage an existing content delivery network infrastructure to provide a system that enhances performance for any application that uses the Internet Protocol (IP) as its underlying transport mechanism.

Another more general object of the invention is to provide an overlay mechanism that improves the performance and reliability of business applications on the Internet;

Still another object of the invention is to provide techniques that enable Internet application users to obtain improved performance during normal network conditions, to obtain or maintain good performance where normal default BGP routing would otherwise force the user over congested or poorly performing paths, or to enable the user to continue communications even during network outages.

The present invention provides a scalable, highly available and reliable overlay service that detects poor performing paths and routes around them, as well as finding better performing alternative paths when the direct path is functioning normally, thereby ensuring improved application performance and reliability.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 4:
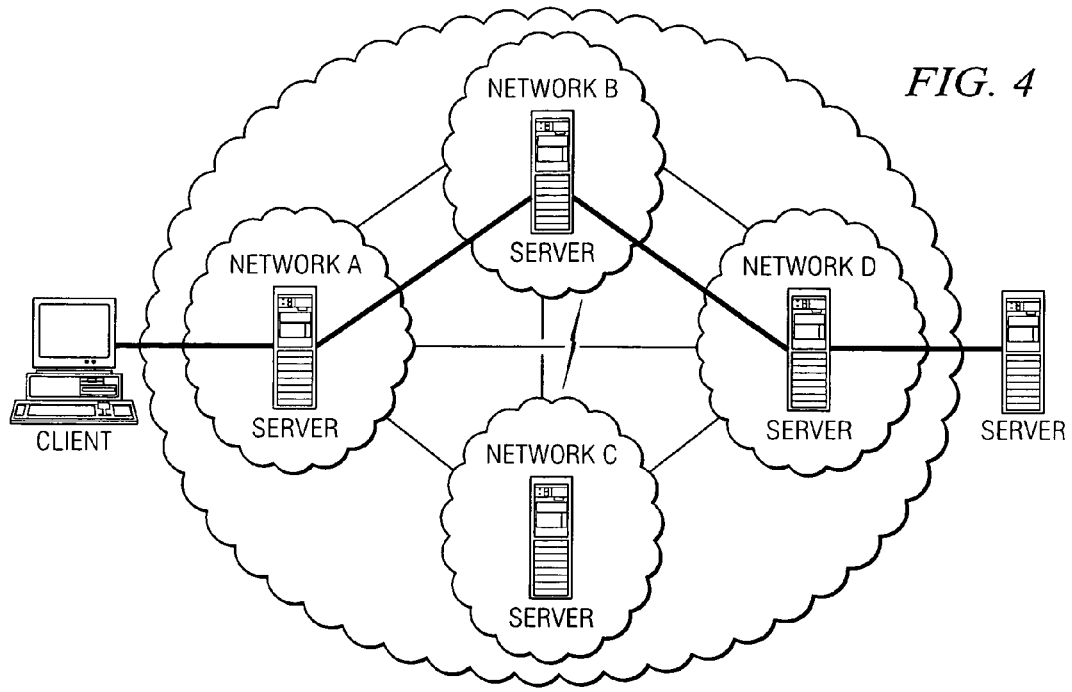
FIG. 4 illustrates how the overlay mechanism of the present invention routes around data links to improve performance.
Figure 5:
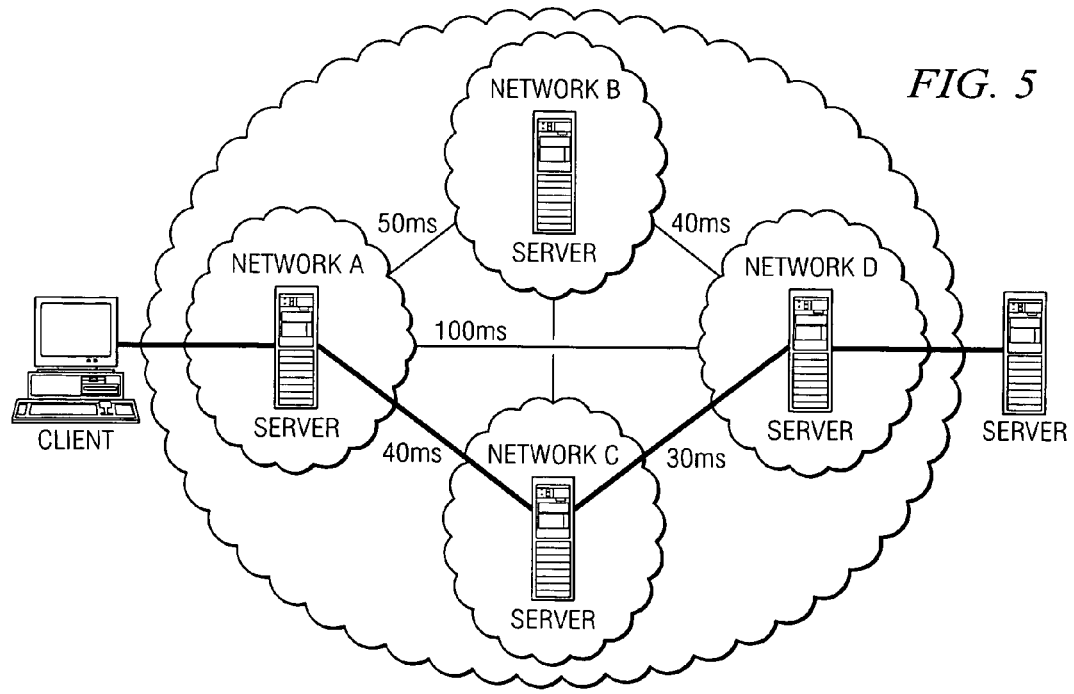
FIG. 5 illustrates how the overlay mechanism of the present invention finds a path with smallest latency to improve performance.

The present invention is an "overlay" mechanism that sits on top of the publicly-routable Internet. Preferably, the overlay leverages existing content delivery network (CDN) infrastructure, although this is not a requirement. Generally, the overlay mechanism of the present invention provides performance enhancements for any application that uses IP as a transport protocol by routing around down links (FIG. 4) or finding a path with a smallest latency (FIG. 5). Thus, in FIG. 4, the link between Networks A and D is down, so the overlay routes the packets through Network B. In FIG. 5, the overlay uses the path through Network A to Network C to Network D, instead of slower Network A to Network D path that BGP routing would dictate. In FIGS. 4 and 5, it is assumed that a client is attempting to communicate with a server. The illustration of a single or fixed client is not meant to be taken as limiting, however. This is a generalization. According to the present invention, the overlay mechanism may be used in many different operating environments. One such environment is where there are multiple clients (e.g., roaming clients) who desire to access a single server (or server farm). This is sometimes referred to a "remote access" embodiment. In another scenario, two or more fixed endpoints desire to communicate with each other. This is sometimes referred to a site-to-site or "remote office" embodiment. Generalizing, and as will be seen, the overlay mechanism operates by receiving IP packets at one set of servers, tunnelling these packets through a series of zero or more CDN servers, and delivering them to a fixed, defined IP address.

Figure 1A:
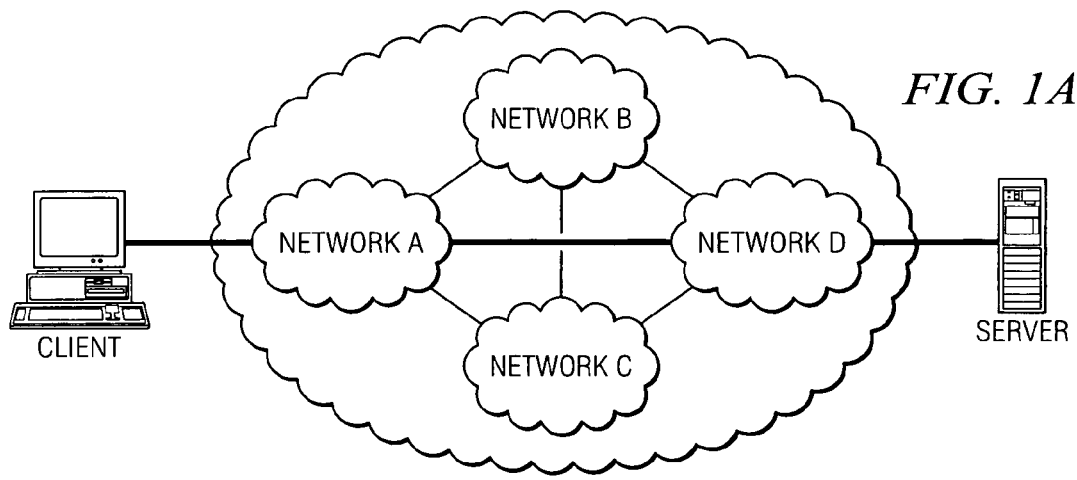
FIG. 1A illustrates a set of four interconnected networks and how BGP determines a route for packets flowing between Network A and Network D.
Figure 1B:
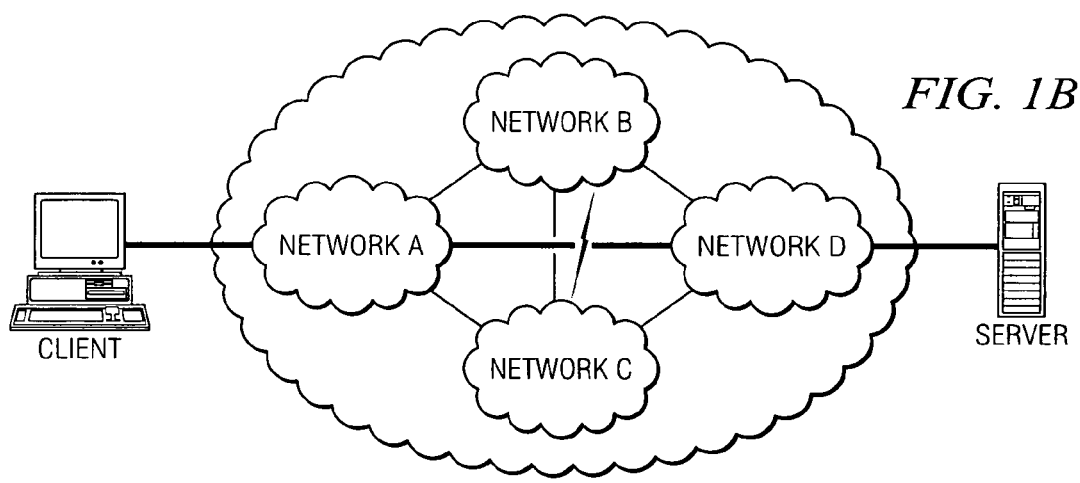
FIG. 1B illustrates how the destination server is unreachable when a problem exists with how Network A peers with Network D.
Figure 2:
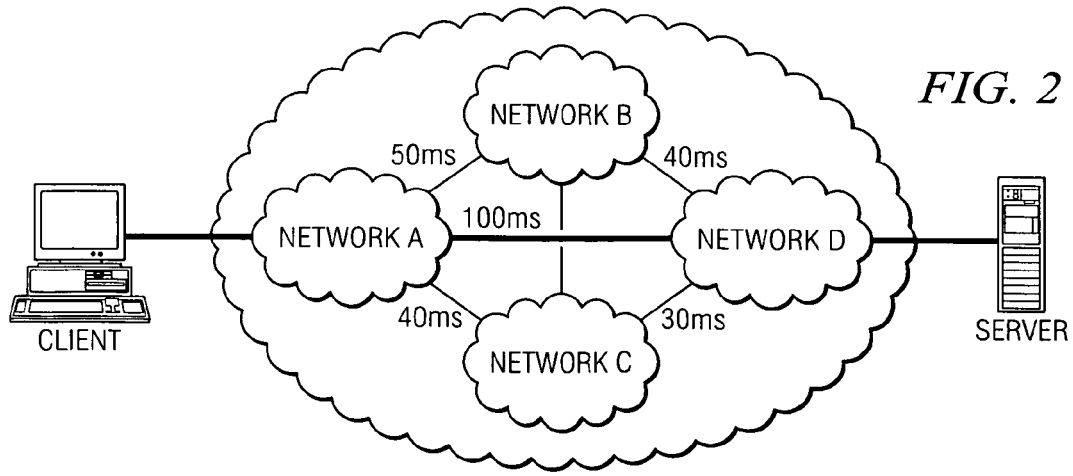
FIG. 2 illustrates how BGP routing decisions are insensitive to latency, which results in poor performance.
Figure 3:
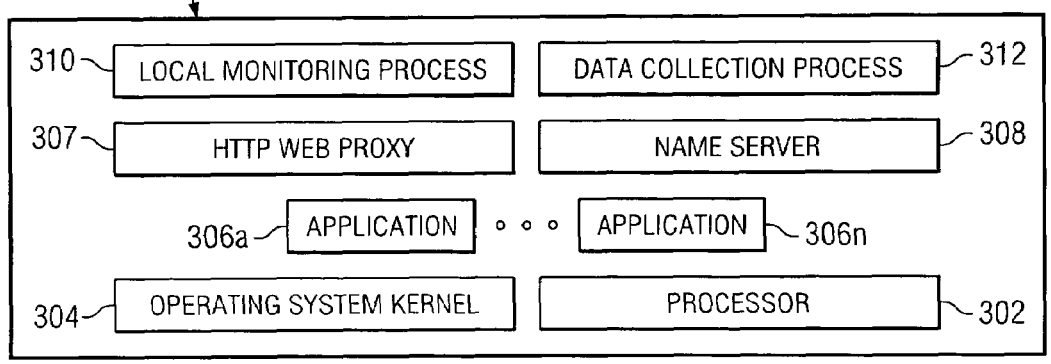
FIG. 3 illustrates a typical content delivery network edge server configuration.
Figure 6:
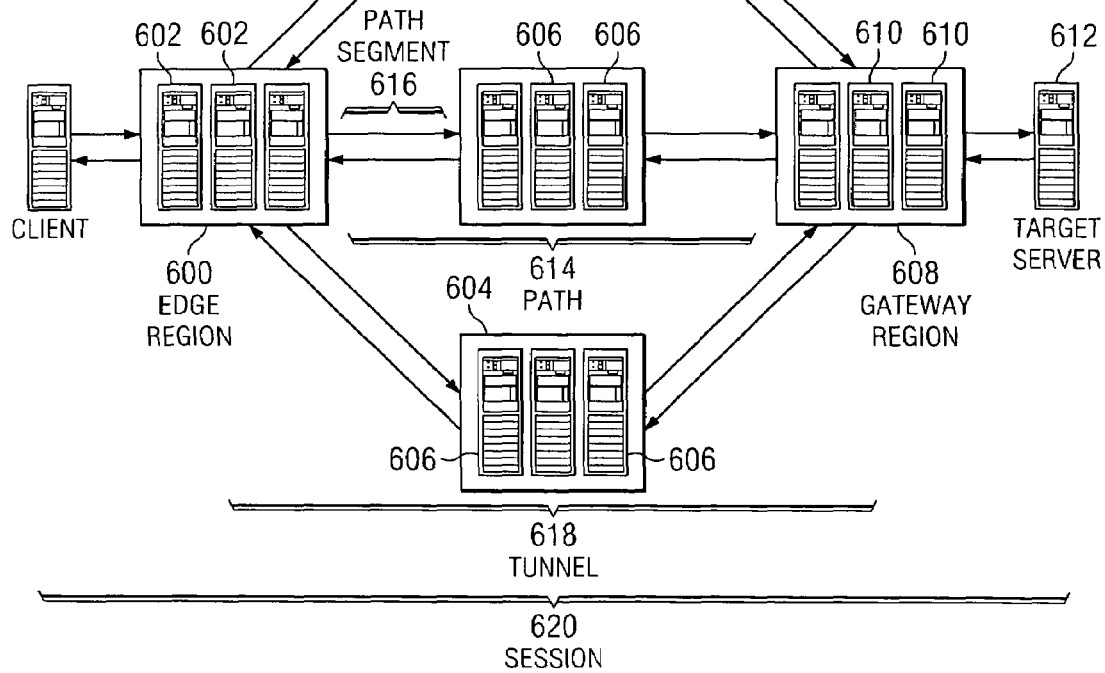
FIG. 6 illustrates a set of components that comprise an overlay mechanism, in accordance with an embodiment of the present invention.

The overlay IP (OIP) routing mechanism of the present invention comprises a representative set of components, as illustrated in FIG. 6:

edge server 602—typically, a CDN edge server running an OIP edge server software process as described below. As will be described, this software is responsible for receiving, encapsulating and forwarding IP packets.

edge region 600—typically, a CDN edge region configured for the overlay mechanism.

intermediate server 606—typically, a server that receives encapsulated packets from an edge region 600 or other intermediate servers and forwards them on to other intermediate servers or to a gateway region.

intermediate region 604—a region of intermediate servers.

gateway server 610—typically, an ddge server that has been configured to receive encapsulated packets from the overlay, and that applies source network address translation (NAT) to the original packets and forwards them onto the target server.

gateway region 608—typically, a type of edge region comprising gateway servers and that is usually deployed on customer premises.

Target server 612—a machine whose traffic is to be tunneled through the overlay.

target address—the IP address of the target server; this address is sometimes referred to as a direct address when being compared to a CDN virtual IP address.

slot—a single "instance" of the overlay; preferably, a slot is a numbered index that corresponds to a single target address.

virtual IP address—typically, a CDN address that corresponds to a slot; preferably, there is one virtual IP address per edge region per slot. It is sometimes referred to as a VIP.

path 614—an ordered set of CDN regions between an ddge region and a gateway region.

path Segment 616—a single hop of a path.

tunnel 618—a set of one or more paths from an edge server to a gateway server.

session 620—A single end-to-end connection from the client 622 to the target server; preferably, the session is defined by a five tuple (IP payload protocol, source address, destination address, source port, destination port). The source is the client and the destination is the target.

Figure 7:
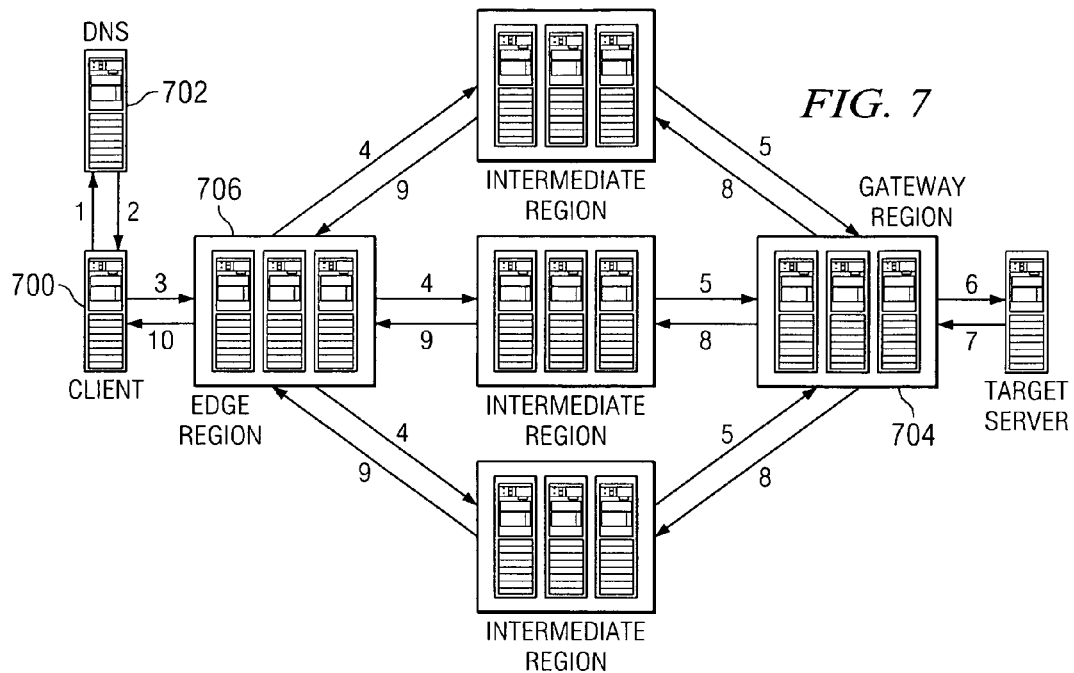
FIG. 7 illustrates how data flows through the overlay mechanism of FIG. 6.

In the first embodiment, remote access, there are one or more clients that desire to send packets to a single IP address. FIG. 7 illustrates how the overlay IP mechanism achieves this operation. At step 1, the client 700 makes a DNS request to resolve a hostname. This hostname is aliased (e.g., by a CNAME) to a domain that is being managed by an authoritative DNS 702; typically, the authoritative DNS is managed by the CDN service provider. Preferably, this hostname corresponds to a single gateway region (and target address) 704. This is also referred to as a slot, as described above. At step 2, the DNS query returns a single IP address for the hostname. This address identifies a best performing available edge region 706 and, preferably, that region is dedicated to the hostname. The address is referred to as a virtual IP address, as described above. At step 3, the client 700 begins to send IP packets to the virtual IP address. These packets are received by a server in the edge region 706. The edge region 706 knows the gateway region 704 to which to send the packets based on the destination address in the IP packet header. The packet is then encapsulated. At step 4, and based on routes preferably provided by a CDN mapping system, the edge server in the edge region 706 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 704, once again, preferably based on routes provided from the CDN mapping system. At step 6, the packets are received by a server in the gateway region 704, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 706 from which the client packet originated. At step 7, the gateway region 704 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the requesting client 700. This completes the end-to-end transmission.

The following provides additional details for a representative edge server, intermediate server, and gateway server.

I. Edge Servers

The edge server runs a process (called oipd, for convenience), that provides the following functions: receives packets on virtual IP addresses; filters packets based on expected protocol/ports, invalid or attack traffic, or specified access control lists (ACLs); encapsulates/decapsultes; forwards duplicate packets; and receives duplicate packets. Each of these functions is now described.

Receive Packets

IP packets destined for a virtual IP address should not be handled by an edge server's TCP/IP stack; they must always be tunneled or dropped. Thus, the edge server operating system kernel includes a hook to intercept packets (and pass them to oipd) before they are handled locally. In a representative embodiment, the edge server runs commodity hardware and the Linux operating system kernel. The kernel includes modules ip_tables, ip_queue and iptable_filter. Upon machine startup, a configuration script sets rules (in the ip_tables modules) such that all packets destined for any virtual IP address are delivered to user space. If no application is listening using the ip_queue module, the packets are dropped.

Packet Filtering

Preferably, three (3) types of packet filtering are supported: expected/allowed TCP/UPD; invalid or attack traffic; CDN service provider or customer-specified whitelist/blacklist ACLs. The edge server process oipd preferably filters TCP/UDP packets based on ports.

Encapsulation

An important function provided by the edge server process is encapsulation. An encapsulation header may contain the following information, or some portion thereof:

protocol version—standard version field.

TTL—the number of hops the packet can travel through before it is automatically sent to the gateway region (or edge region depending upon direction). It is decremented at each hop.

path number—each path a packet is sent along will have an identifier. This number preferably corresponds to an index specified in the map or other data structure.

forward state—used by the gateway server.

data length—the number of bytes in a payload of a OIP packet.

Source service address—the encapsulating machine's service address.

destination service address—the service address of the receiving side of the tunnel.

message sequence number—used to identify duplicate packets and determine loss across a tunnel.

OIP slot number—the slot for the packet.

serial number—determined by hashing information of the IP packet.

edge region number—the region number of the region sending the packet.

SRMM middle region map rule—determines which intermediate regions can be used for this slot.

message authentication code—used to determine authenticity of an OIP packet.

When a packet is to be encapsulated, the oipd process knows the CDN customer based on the virtual IP address in the destination address field in the IP header. The process then looks up a configuration file that contains the following map:

Virtual IP address->SRIP slot number

This is sometimes referred to as a "VIP map." Preferably, this map is determined at install time and the various edge server components have a consistent view of it. The slot number is then used to look up a gateway region number for this customer, preferably using a "Slot Configuration Map" that is generated by a slot configuration file. The edge server process then hashes information into a serial number to break up the load into manageable chunks for load balancing. Preferably, the hash contains at least the source IP address. In the case that the next header is TCP or UDP, the source port and destination port may be hashed as well.

The edge server process subscribes to a first low level map (service B, as described below) that maps serial numbers to service addresses. In particular, the serial number is used to index the map to identify the gateway region that contains a single service address. This is the service address for which all (e.g., three (3)) copies of the packet will be sent. The edge server process then checks to see if it has forwarded any packets to this address in the past. If so, it increments a sequence number and uses this number in the "message sequence number" field in the encapsulation header. If the edge server process has not sent anything to this IP address yet, it initializes the state as described below.

Forward Packets

The "forward packets" function operates as follows. At this point, most of the encapsulation header is filled. The additional information for the header is generated as follows. Preferably, all edge servers subscribe to an assignment process (called SRMM and described below) that maps: MapperX.OIP.sr_assn_D_regionY where X is the correct Mapper prefix and Y is the region number. A destination region number and the SRMM middle region rule are used to index an assignment message. This yields one or more next hop region numbers, and preferably the number of next hop regions is configurable per slot. Each next hop is indexed with a path number. This path number is included in the encapsulation header so downstream intermediate nodes know their next hops. If an assignment message does not have any next regions, a single encapsulated packet is sent to the destination server address (and this should trigger an alert in the NOCC). For each of the next hop regions, a second low level map (service C, as described below) is checked. The serial number used to index this map preferably is the one included in the encapsulation packet header. Preferably, each of these maps contains only a single service address for each serial number. This is the service address where the packet should be forwarded to next. Preferably, the serial number is derived from connection identifying information (i.e., the five tuple). If the next region to be sent to is the gateway region, the first low level map does not need to be checked because this was already done by the sending edge server. Preferably, this initial lookup is done before a packet is sent along multiple paths to avoid having to synchronize intermediate regions.

With the header information finished, a MAC is computed for the header and the data. The computation may be based on SHA-1, MD5, or the like. To simplify the forwarding by intermediate nodes, the TTL field may not be included in the hash as this field is mutable.

Duplicate Packets

The edge server process preferably sends duplicate packets, as has been previously described. As noted above, preferably the edge server process sends multiple copies of each packet in several directions for redundancy. The receiving side needs an efficient way to filter out duplicates. When handling duplicate packets a first goal is to drop as few packets as possible; a next goal is to send as few duplicate packets as possible on to the target server. The edge server process tracks duplicate packets at the tunnel level. For every (edge source address, edge destination address) pair, the edge server process preferably maintains a sliding window of state indicating which packets have been received (and which have not) for every service address it receives a packet from. One processing algorithm is now described. The algorithm has one parameter, which is the size of the window, and two data objects to maintain: the window and the highest sequence number seen so far adjusted for wraparound. Preferably, the window size must be large enough so that it is not unnecessarily reset. So, oip.packet.window.size>= (max_packet_rate*max_packet_age)

On initialization, preferably, the entire window is initialized to NULL. The highest sequence number is set to the number of the first packet and the entry in the sliding window is set to SEEN. For every new packet, if the sequence number>highest sequence number+oip.packet.window size, the state is initialized and started again. If the packet is within the window but less than the highest so far, the algorithm checks if the entry in the window has already been set to SEEN. If so, the packet is dropped; otherwise, it is marked as SEEN. If the packet is greater than the highest so far, the algorithm sets the highest to the packet, marks that entry as SEEN and all entries between as UNSEEN. Using three values requires two bits for state, although using two values is sufficient for correctness. If a sender restarts, there is a small chance that a randomly chosen sequence number will be in the current window the receiver is maintaining. This could cause packets to be dropped unnecessarily. To prevent this, preferably a sender periodically writes a map of (service address, last sequence number) for every service address to which it has sent data. When an edge server starts up, it reads this file and adds a large number to it to ensure it is not in the window. This value should be safely larger than the window size.

As noted above, preferably an edge region comprises a number of edge servers. Accordingly, the system may implement an edge server failover function. This ensures that if a single edge server fails, the number of packets that will be dropped as a result is minimized. Each edge region preferably has buddy groups of a given number of configured machines. For duplicate removal to work on failover, the SEEN packet state is published to all machines in the buddy group periodically. This data is likely to be changing very frequently. So, preferably each machine sends an update to all machines in its buddy group indicating the highest sequence number SEEN. Each machine sends this information over the backend network to all machines in its buddy group, preferably using TCP.

II. Intermediate Servers

Intermediate servers have a "forward packets" functionality that is similar to that implemented in an edge server. The intermediate servers subscribes to the same MapperX.OIP.sr_assn_D_regionY channel. Each intermediate region is assigned a SRMM middle region rule and should only receive packets for slots that are configured for that rule. A destination region number and the slot's middle region rule are used to index an assignment message to determine the next hop. If a machine receives packets for a slot that has a different middle region rule, it should continue to send it on, but it should trigger an alert. If sending to another intermediate region, the second low level map is used to determine the service address of the next hop server. If the next region is the gateway region, the destination service address in the header preferably is used. Before the packet is sent on, the TTL field must be decremented. If the TTL reaches one, the packet is forwarded to the gateway region service address.

III. Gateway Servers

As mentioned above, preferably the gateway region is a special edge region that is generally located at the customer's data center. Ideally, this is somewhere close to the target server. The gateway server also runs an instance of the edge server process oipd, which can act simultaneously as an edge and gateway. Each machine in the gateway region preferably has its own CDN-specific IP address used for installs and secure access, and as a service address used for overlay network communication. Preferably, and as described above, a single VIP address is used for fixed client mapping and several NAT addresses are used. The gateway region preferably contains several machines for redundancy. These machines may be load balanced.

The gateway server provides the following functions: connection tracking, state synchronization, network address translation, sequence number translation, in-region packet forwarding, returning packets to the edge region. Each of these functions is now described in detail.

Connection Tracking

To track connections, the edge server process oipd makes use of NAT library such as libalias, which performs masquerading and IP address translation. This library preferably stores connection tracking information in a hash table or other data structure. When a new connection is established, a new entry is added to the table. When an existing entry is referenced, its timestamp is updated. When an existing entry has not be referenced in a given time period (the meaning of which varies based on protocol and connection state), the entry is deleted from the table. When a new connection track is created, in addition to being added to the standard libalias database, preferably it is also added to a list of newly-created but not yet synchronized connection tracks. When an existing connection track is modified, it is added to a list of modified but not yet synchronized entries, unless it is already in that list or in the new entries list. When an existing connection track is deleted, it is removed from the libalias database, and it is added to a list of deleted entries (unless it is currently in the new entries list, which means that information about it was never synchronized and so the deletion information does not need to be synchronized). The oipd process will periodically synchronize updates to the database (the new, modified, and deleted lists). This allows the connection tracking database to be shared across an entire gateway region so that per-connection state information can move between machines in the gateway region.

State Synchronization

The oipd process running in the gateway server preferably associates several pieces of information with a single connection. This information is synchronized across all machines in a gateway region. To this end, a series of functions is added to libalias to facilitate the gathering of data to be synchronized. There is one function for synchronization of each type of list (new, mod, delete), one for gathering all records to initialize a peer machine, and one for responding to a query for a single entry. These functions are now described.

A function GetSyncNewData builds the data packet for synchronization of all new records that have not yet been synchronized. In the case of TCP packets, only those packets that are considered fully connected (i.e. the SYN packet has been seen from both the client and the server) will be synchronized. Preferably, the oipd process ensures that a single connection will always be handled by the same machine until it is marked as fully connected. This ensures that potential race conditions related to synchronization of partially connected tracking entries and their expiration times can be avoided.

A function GetSyncModData builds the data packet for synchronization of modified records that have not yet been synchronized. It is desirable that an active entry be synchronized at least often enough to ensure that it does not time out in the database on a remote machine. Preferably, the oipd process ensures that every entry in the list is synchronized at least periodically (e.g., the timeout period for a UDP connection entry). This ensures that connection entries do not incorrectly timeout while at the same time limiting the bandwidth required to keep the gateway region synchronized.

A function GetSyncDelData gathers the information for deleted records and a function GetSyncAllData gathers the information for all entries in the database.

When synchronization data is received by a remote machine, it is passed in to a function SetSyncAddData if it applies to active connections (i.e. it was gathered by GetSyncAddData, GetSyncModData, or GetSyncAllData). This method creates a new connection entry in the local database or updates an existing entry, if there is one. For TCP connections, the state of the connection is tracked by libalias, preferably using two finite state machines, one for each direction (in/out). The function SetSyncAddData ensures that the finite state machine on the local machine follows valid transitions so that an active connection is not incorrectly marked as not connected or disconnected. Synchronization data relating to records to be deleted is passed to a function SetSyncDelData, which removes entries from the local table as long as the local table's timestamp for the entry is not more recent than that of the deleted entry.

Preferably, these libalias synchronization routines are used by a NAT_sync module, which contains a sender thread and a receiver thread. This module is initialized with the frontend and backend addresses of all its synchronization peers (e.g., all other machines in the gateway region). The sender thread connects to one of its peers to retrieve a full snapshot of the connection tracking table as part of its initialization procedure. It then tries each peer in turn until it finds one that is responsive; it then requests a table update from that machine. Preferably, no other overlay activities proceed until this initialization is complete or all peer nodes have been tried. The sender thread preferably uses a real-time clock to drive synchronization. For every clock iteration, the sender thread uses GetSyncAddData, GetSyncDelData, and GetSyncModData to collect data for synchronization. This data is then sent to all live peers in the region. To check for liveness, the sender thread preferably attempts to establish a TCP connect to a peer node using the last known good address (either the frontend or the backend). If that connection fails, then the sender thread attempts to establish a connection over the other address. If that fails, then the peer is assumed to be dead, although it may be tried again on subsequent synchronization attempts. The rate at which the sender's synchronization clock iterates is set in libalias for use by the GetSyncModData algorithm to determine how many modification records to send in each synchronization period. The rate is configurable. As noted above, on each clock iteration, all new connection entries (except half-connected TCP), a reasonable number of modification entries, and all deletion entries will be synchronized. The receiver thread simply waits for remote connections to come in, and then processes them according to message type. Update and deletion messages are passed to the appropriate SetSync method. Initialization requests cause the receiver to run a function GetSyncAllData, and then to send the data to the remote machine.

Network Address Translation

Figure 8:
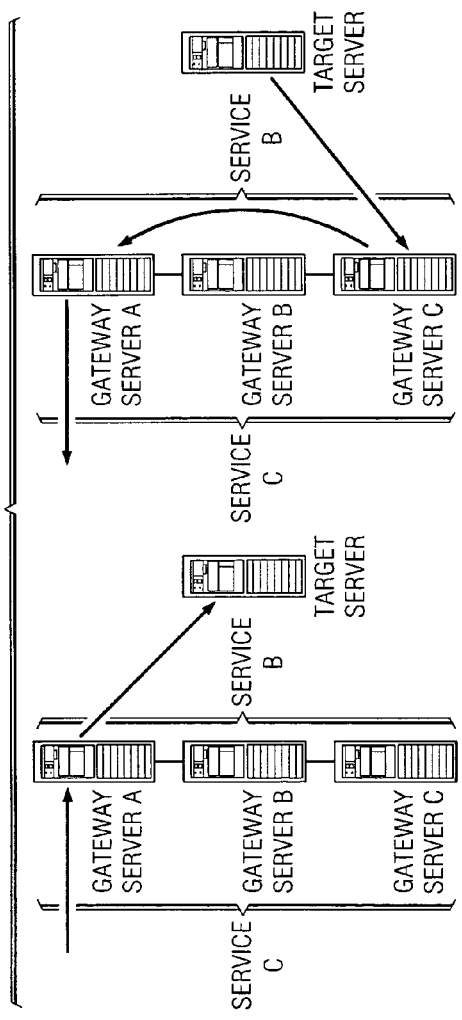
FIG. 8 illustrates how a gateway region may manage network address translation NAT in one embodiment.

As described above, the overlay performs source network address translation (NAT) for all packets arriving on a service address (the gateway) that are to be sent to the target server. This ensures that the packets will be sent back through the overlay. Addresses for source NAT preferably are defined on a per-region and per-machine basis. Preferably, given machines are not assigned a static NAT address, as it may be desirable to move around NAT addresses. Also, when a packet arrives at a gateway server, preferably the NAT is applied differently depending on the type of connection involved. These connection types are configurable, e.g., per service or per port: TCP, long-lived; TCP, short-lived; UPD—session; UDP—query/response; and ICMP. Query/response UDP connections typically only involve a single UDP packet from client to server and zero or more response packets from server to client. For UDP query/response and ICMP, preferably a new NAT address, port/ICMP id is chosen for each incoming packet. Preferably, each machine in the gateway region is given its own port/ICMP id range for which only it is allowed to use to create new NAT sessions. Upon receiving a packet, the edge server process (described in more detail below) chooses a free address, port/ICMP id and sends the packet to the target server. The machine that owns the NAT address receives response packets from the server, but typically it will not have NAT session information to translate the addresses back. Thus, the machine preferably checks the destination port/ICMP id and forwards the response to the machine that owns that port/ICMP id. This second machine then translates the packet back to contain the original client address and port/ICMP id and sends it back over the overlay. This operation is illustrated in FIG. 8. For both types of TCP connections, preferably a new NAT address and port are chosen only when a SYN packet is seen. In either case, the NAT source port number is used to direct packets back to the server that created the session. For long-lived connections, it is desirable to reduce the amount of data that needs to be sent between gateway servers; preferably, this is accomplished by synchronizing the NAT session information. In particular, when a data packet arrives, an edge server process (as described below) determines if any connection state data exists. If so, the process applies the source NAT and sends out the packet. If connection state data is not available, the edge server process forwards the packet to an owning machine. For UDP connections that involve multiple packets from the client, a machine will check if it has session information for the client address and port. If so, the machine uses that NAT information. If not, the machine preferably acquires a region-wide lock for this client address, port. This ensures that if packets arrive simultaneously on two gateway servers, only one of them will establish the NAT session.

Sequence Number Translation

Figure 9:
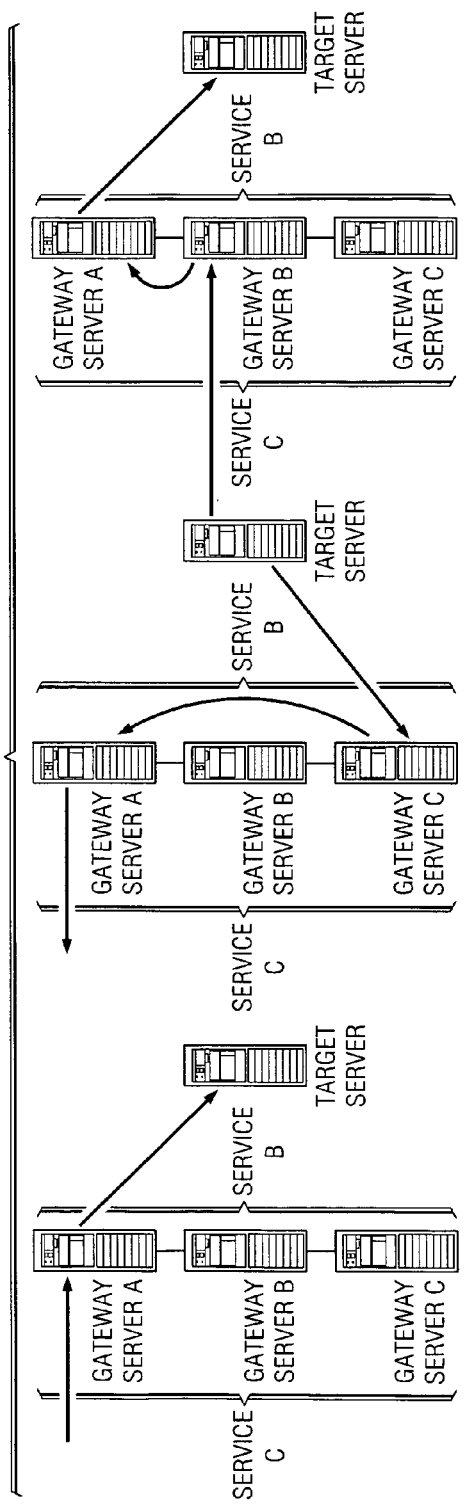
FIG. 9 illustrates a sequence number translation function that may be carried out within a given gateway region.

When the oipd process in the gateway server receives a SYN packet from the target server to the client, it performs a sequence number translation to tag the packet indicating its host id in the packet. Whenever this process receives a packet from the overlay, if it does not have the state information for the packet, it looks at the sequence number to determine the gateway server to which it should forward the packet. Preferably, each hosts is assigned a unique identifier. Each gateway region is assigned a maximum size and a sequence number space preferably is broken up into 2*max size pieces. To support SYN cookies, preferably only the highest eight bits are modified and each host is assigned two consecutive blocks of sequence number space. When the first packet arriving at a gateway region is handled by one server and a subsequent packet is handled by a different server before the state is synchronized, the second server preferably one uses the high eight bits in the ACK sequence number to determine the server to which server it should send the packet. This is illustrated in FIG. 9. Before sending a packet to the target server, the oipd process must unapply the sequence number translation so that the target server gets the correct ACK sequence number.

In-Region Forwarding

Before forwarding a packet to another gateway server, a forward state in a header field is modified to indicate that the packet has already been forwarded. The receiving machine handles this packet as if it was received from the overlay, but if the oipd process needs to forward the packet again for any reason, it will instead drop the packet.

Returning Packets to the Edge Region

Preferably, a packet is sent from the target server back through the overlay to the same edge region that sent it originally. This ensures that the edge server there will be able to send out an IP packet with the source address of the Virtual IP to which the client originally sent a packet. When a packet is received at the gateway region, the encapsulated IP packet contains the virtual IP that the client used and the header will contain the edge region number. This information is stored with the connection and synchronized in the same way as the NAT session information. When a gateway server receives a packet from the target server, it replaces the source IP address (which contains the target address) with the virtual IP stored. It then forwards the packet on to the correct region.

As in the edge server regions, preferably a gateway region implements a buddy group of servers. This group is configured for a region, and each server therein includes a monitoring process to check for liveness and load. As necessary, machine or software failover can then be implemented.

Load Reporting

Figure 10:
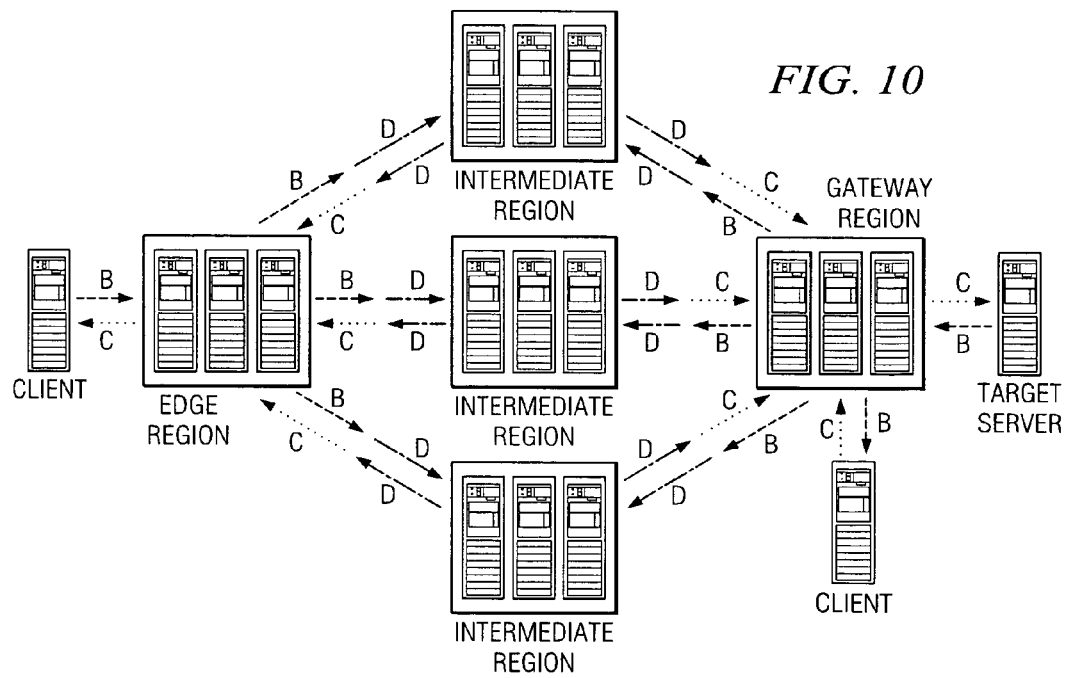
FIG. 10 illustrates how different pieces of load information are reported on within the overlay.

The overlay mechanism preferably implements load balancing. To this end, preferably each server executes an in-machine DNS process that performs several load balancing functions: mapping Virtual IP addresses and NAT IP addresses to live edge servers, mapping serial numbers to live edge servers, and mapping serial numbers to live intermediate servers. These functions require three (3) distinct services: service B, service C, and service D. Service B represents the bytes entering the overlay, whereas service C represents the bytes exiting the overlay. FIG. 10 illustrates how different pieces of load information are reported on the different services.

Service B maps both virtual IP addresses and NAT addresses onto machines. At install time, a one-to-one mapping from slots to virtual addresses and NAT slots to NAT addresses is established. To ensure that all regions can support the same number of VIP slots, a network wide configuration variable is set, leaving a given set of serial numbers in a service B map for NAT addresses. NAT slots begin with a slot number and work downwards. For service B, the in-machine DNS process needs to know liveness of the edge server, capacity of the machine in bytes, and a byte load per slot. A monitoring process running on the machine is used to determine liveness. The oipd process reports the byte load in and out of the server to the monitoring process. For service C, the in-machine DNS process needs to know the liveness of the edge server, a capacity of the machine (according to a given metric), and a value of that metric per serial number. A representative metric is a "flit." A "flit" is an arbitrary unit of work generally representing non-bandwidth resource usage on a given server machine. Such utilization typically encompasses CPU utilization, disk utilization, operating system abstraction-limited resources such as threads and semaphores, and the like, and combinations thereof. In a representative embodiment, a flit is a given linear or convex function of several individual machine variables, such as CPU and disk utilizations. For the load balancing described generally below, however, the number of bytes entering the server is a good approximation for the flit value. For service D, the in-machine DNS process needs to know the liveness of the intermediate server, a capacity of the machine (according to the given metric), and a value of that metric per serial number.

Region Assignment

A region assignment process executes in the overlay mechanism's authoritative DNS. Because every connection mapped to a region has corresponding traffic to that region from client->server and server->client, both services B and C need to be taken into account. To this end, a region monitor process reports a sum of bytes in and out on both services B and C. The region assignment process needs to know an edge region flit capacity metric, and an edge region byte load and flit load (for services B and C). Each connection mapped to a region affects the amount of load the region sends and receives because packets preferably are sent to the edge region from which they originated. To handle this properly, the region assignment process preferably uses the maximum of bytes in, bytes out to determine how loaded a region is.

Map Maker

The assignment process (SRMM) uses two pieces of information: bytes per destination region (same as slot), edge region pair; and region flit load for intermediate regions. An oipd process on the edge reports byte load that will be injected into the overlay, preferably broken down by destination region. This is the demand that is put on the overlay and is the value sent in a new message from the region monitor to the SRMM process. The intermediate regions report total service D bytes and flits. Because flit load correlates to byte load, the SRMM process preferably use the edge bytes as demand and the flit cap and a byte/flit ratio to infer a reasonable byte cap in the middle regions. This information goes into an existing region assignment message to which SRMM then subscribes.

The (SRMM) process generates region level maps that specify the best paths from an edge region to a gateway region, as well as the best paths from the gateway region back to the edge region. As noted above, preferably SRMM receives demand input from edge regions and load and capacity information from the middle regions. In addition, each intermediate region is assigned to one or more middle region map rules and each slot will be assigned to a particular middle region map rule. Preferably, SRMM only maps traffic for a particular slot through intermediate regions that have the same map rule.

In operation, SRMM determines multiple paths from every edge region to every gateway region while ensuring that no two paths share the same intermediate region and that all intermediate regions are properly load balanced. By default, it will choose three paths. To handle these requirements, preferably the following simplifying assumptions are made for the SRMM algorithm: the first path chosen is optimal (i.e. it can support multi-hop paths) given information from a ping subsystem providing there is sufficient capacity; and, the next two paths contain only a single intermediate region.

The path determination is broken down into two parts corresponding to the assumptions above. The first part involves running a sequence of shortest path algorithms. For each middle map rule, Dijkstra's algorithm is run for each destination, where destination is all edge and gateway regions. The edge byte load is used as demand in these calculations and a running total is tracked for each intermediate region. If the total load is under capacity for each intermediate region, this part of the path determination is done. If it is not, all nodes that are over capacity will have a price adjustment, and the algorithm is repeated. The price adjustment is applied by multiplying a constant factor to the scores of each of the links that use the overflowing node. This process is repeated until stable. Then, the capacities at each node are updated.

In essence, a list of (source, destination) pairs of (edge regions gateway regions) is determined. For each one, the algorithm chooses the best intermediate node with sufficient capacity for that pair. The output of the algorithm creates an IP assignment message for service D per region. It is indexed by (destination region, path number).

Edge Mapping

As noted above, to use the service offering, customers CNAME a hostname to the CDN service provider's DNS, which then becomes authoritative for that domain. If desired, the hostname may in turn be configured to a global traffic management hostname to provide additional advantages.

Figure 11:
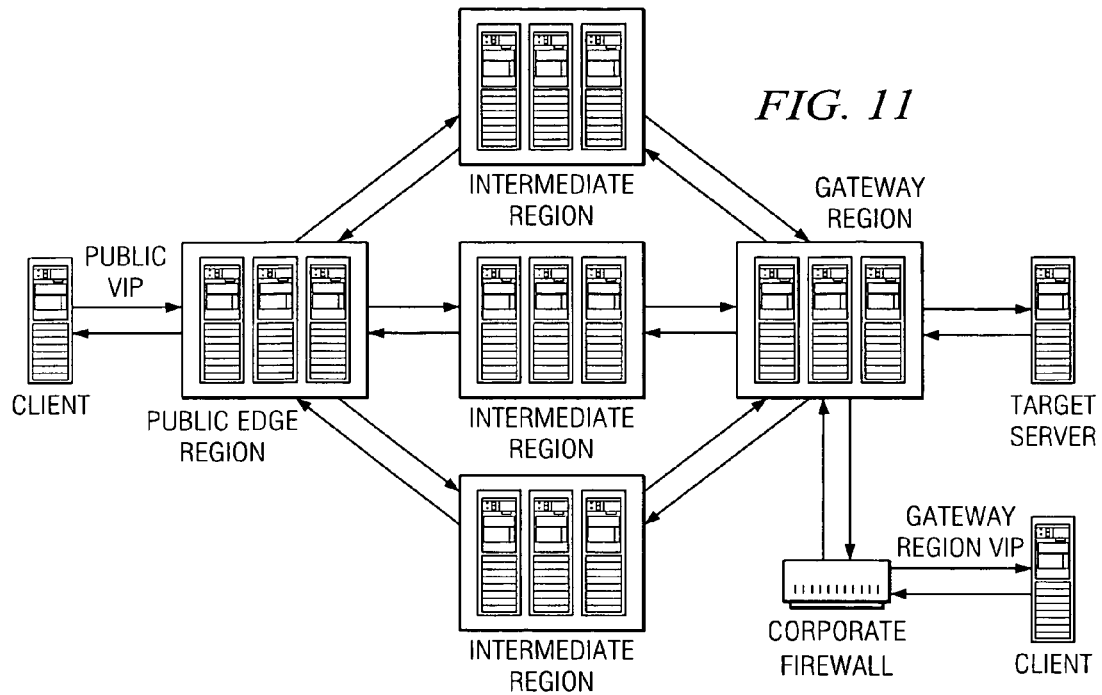
FIG. 11 illustrates an alternate embodiment of the invention wherein a client behind a corporate firewall IP is mapped directly to a gateway region while other clients are mapped to public regions.

By way of background, the overlay mechanism may use "per-customer" regions. A per-customer region supports traffic for only a single slot. Such an approach is desirable for users behind a corporate firewall. In particular, such users can then be mapped to a CDN region located near the target server that will keep LAN performance from degrading into WAN performance by going to a public CDN edge region. In FIG. 11, the client behind a corporate firewall IP is mapped directly to the gateway region, while other clients are mapped to public regions. Using global traffic management, the users with specific, predefined source IP addresses are mapped to these "per-customer" regions.

Figure 12:
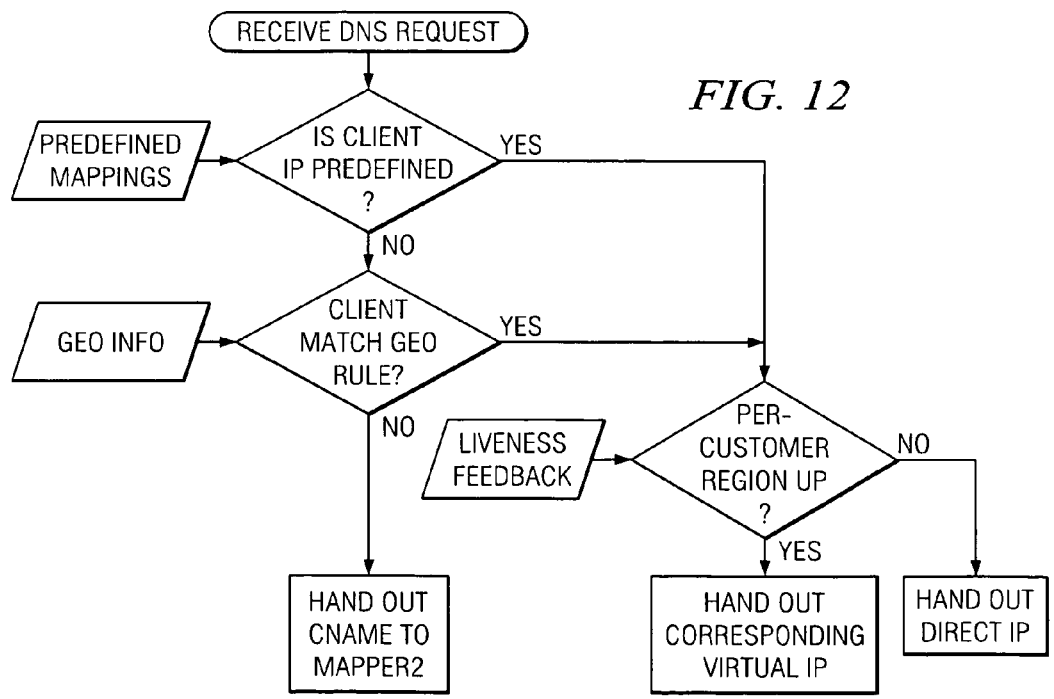
FIG. 12 is a process flow diagram that illustrates how a global traffic management (GTM) process may be implemented within the overlay in the alternate embodiment.

FIG. 12 is a process flow diagram that illustrates how the global traffic management (GTM) process may be implemented within the overlay to provide this functionality. Where information is not available at a given decision point, preferably the "No" path is taken. Thus, if the GTM does not have any predefined mapping data, the client is mapped to a public region. Likewise, if the GTM does not have any geo information, the client is mapped to a public region. If the GTM does not have liveness feedback information, it assume the region is down and maps the client using the direct IP address. The GTM preferably obtains liveness information from the gateway region by running a ping test to the virtual IP in that region.

Fail-Safe Mapping

Figure 13:
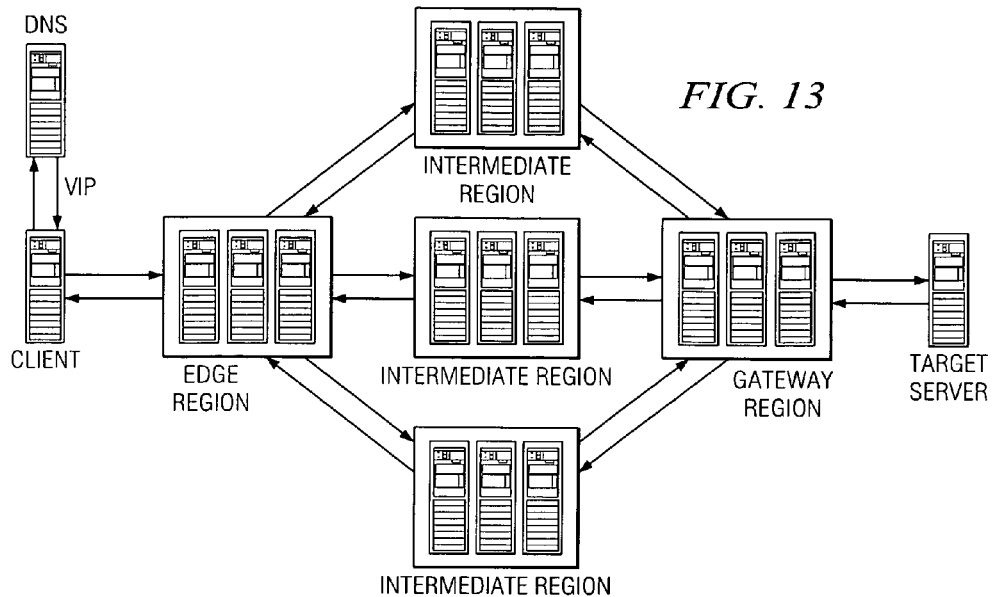
FIG. 13 illustrates normal overlay routing.
Figure 14:
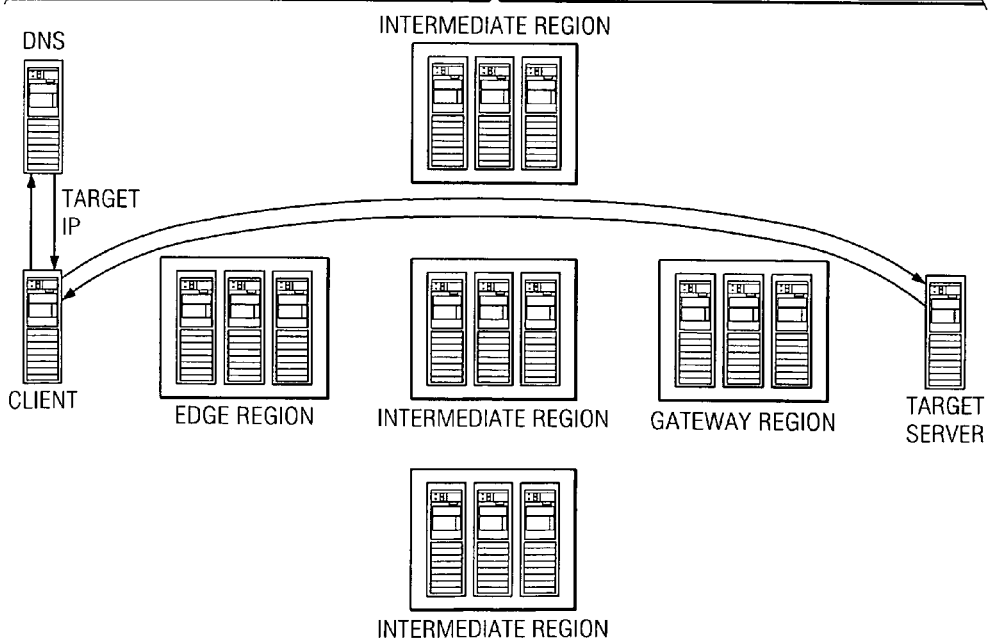
FIG. 14 illustrates a fail-safe operation for the overlay shown in FIG. 13.

By way of background, a customer's target server address may be considered a fail-safe IP address. If the overlay detects any end-to-end problems (either customer-specific or otherwise), preferably the CDN's authoritative DNS hands out this IP address. This has the effect of removing the overlay from all communications. FIG. 13 illustrates normal overlay routing, and FIG. 14 illustrates the fail-safe operation. The fail-safe operation may be triggered as a result of various occurrences, e.g., any per-customer per-region problems, where multiple regions are down or out of capacity, where the GTM does not have liveness information from testing the virtual IP at a gateway region, where one or more name server processes do not have sufficient information to make assignments, or the like.

Management Portal

The CDN service provider may provide a customer facing extranet that allows customers to log-in and perform necessary routing configuration as well as view performance and traffic utilization statistics. Routing configuration includes entering BGP information so the edge servers may establish a BGP session with the local router and the application IP information for the applications that will use the overlay network.

The overlay mechanism of the present invention provides numerous advantages. Preferably, the mechanism continuously monitors and analyzes performance from each local edge node to the intermediate nodes, from each local edge node to each remote edge node, and between all intermediate nodes. Thus, for example, these performance measurements include latency and packet loss. This data is then combined and analyzed to determine optimal paths between two edge locations. If the overlay network is able to provide a better path than the BGP-determined path, the edge nodes will then intercept packets and route them via intermediate nodes. In addition to routing around poor performing paths, the overlay also uses packet replication to ensure uptime. The performance measurement granularity of the overlay is such that an outage could otherwise disrupt the transmission of packets. To avoid this problem, packets are replicated at the edge and sent via multiple overlay paths. One of the paths may be the directly routed path, but packets are intercepted and encapsulated at the sending edge and de-encapsulated at the remote edge. Preferably, the first packet received at the remote end is used and the others are dropped. In an alternative embodiment, a fail-safe IP address (typically the target server's IP address) is handed out by the CDN authoritative DNS under certain conditions.

Remote Access Embodiment

Figure 15:
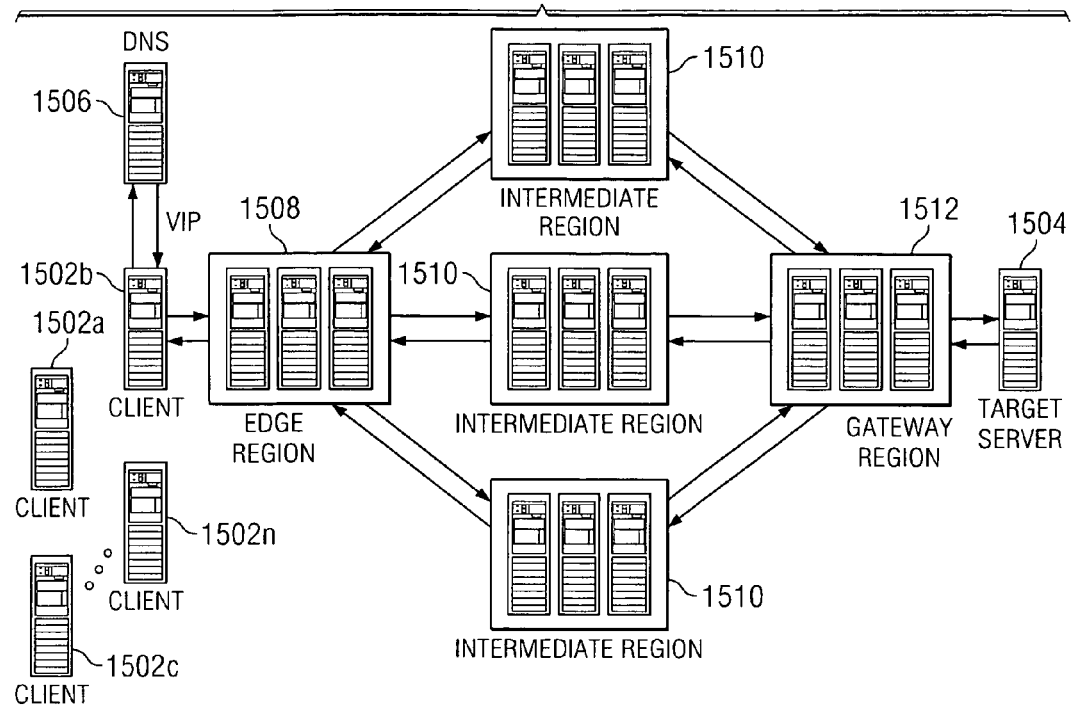
FIG. 15 illustrates how the overlay mechanism is used to implement multi-client remote access to a given application on the target server.

In the remote access embodiment illustrated in FIG. 15, multiple clients 1502a-n are sending packets to a single IP address, the target server 1504. The overlay mechanism 1500 comprises the authoritative DNS 1506, at least one edge region 1508, one or more intermediate regions 1510, and one or more gateway regions 1512. An application of interest is executable in part on the target server. A client side of the application executes on the client machine, which may be a laptop, a mobile computing device, or the like. The particular functionality of the application (or how the application is implemented in a distributed manner across the client and server) is transparent to the overlay. It is merely assumed that communications between client and server occur over an IP transport. In this embodiment, the application is associated with an Internet domain. As has been previously described, that domain is aliased (via a CNAME) to an overlay network domain being managed by the service provider. A DNS query to the application domain causes the authoritative DNS 1506 to return a VIP address. A given client (whose machine typically runs a client side application or instance) then connects to the application on the target server through the overlay mechanism as has been previously described. In particular, data packets destined for the application are encapsulated at the edge, duplicated, forwarded over multiple paths, and then processed at the gateway to remove duplicates. At the gateway, destination NAT translates the virtual IP to the target address and source Network Address Port Translation is applied to the packet before it is sent, so that the return traffic will also be sent over the overlay network. Preferably, information is stored so that return traffic is sent to the edge region from which the client packet originated. When the application responds, the gateway region receives an IP packet from the target address and de-NATs the packet. The packet is then encapsulated. Multiple copies of the packet are then sent along multiple paths. The intermediate servers send the packets back to the original edge region for this session. The packets are received by an edge server and duplicates are removed. The packet is sourced from the virtual IP address and then sent back to the requesting client.

Remote Office Embodiment

Figure 16:
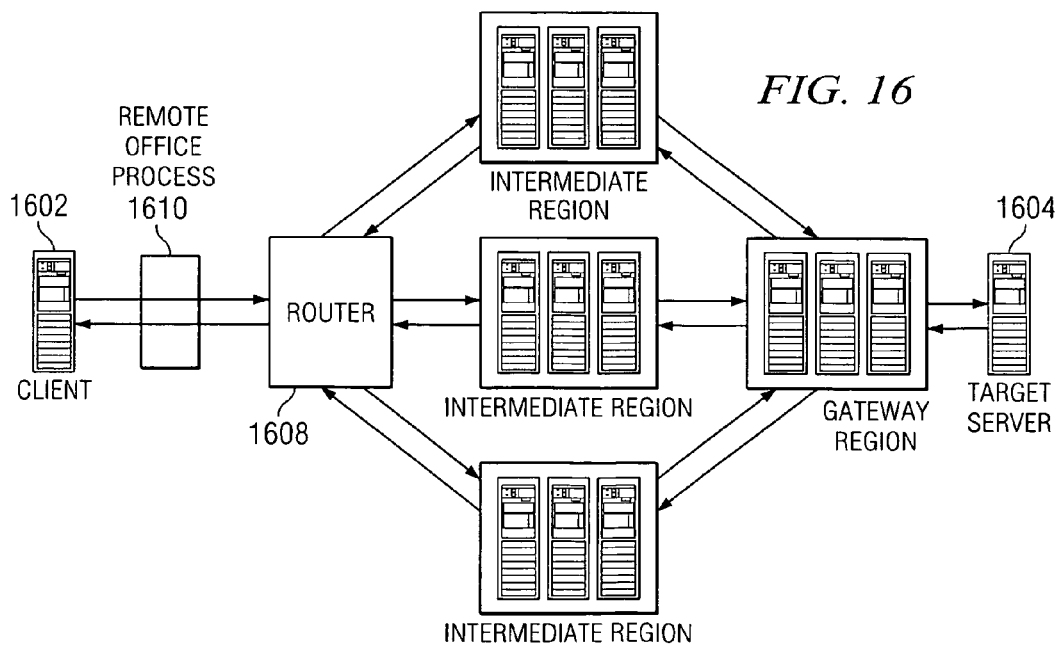
FIG. 16 illustrates how the overlay mechanism is used to implement site-to-site (remote office) to a given application on the target server.

In this embodiment, as illustrated in FIG. 16, an application executes on a target server 1604 and the client machine 1602 (which itself may be an application or application instance) is on a fixed, remote endpoint. In a representative example, the client 1602 and server 1604 are located at a pair of geographically-distributed sites. For ease of discussion, it is assumed that the client machine 1602 is located outside an enterprise firewall but adjacent a router 1608. In this embodiment, the client machine 1602 executes remote office acceleration (ROA) process 1610. The process 1610 advertises itself as the target server IP address; thus, router 1608 sees that process as a router. By advertising the target server IP address, the process 1610 establishes a BGP session with the router 1608 and thereby transparently intercepts data packets intended for the application located at the remote office. Once intercepted, the process 1610 performs the encapsulation and other functions performed by the edge server in the remote access embodiment. The overlay mechanism provides the packet communications between the two sites in the manner previously described.

In the remote office embodiment, the overlay provides a method of data encapsulation by degenerate use of the BGP protocol. Generalizing, this technique can be used for any given Internet protocol including EGRP, OSPF, and the like. While the degenerative BGP approach is preferred, packets may also be provided to the overlay using an in-line approach (e.g., a packet grabber).

Variants:

To save both client bandwidth and reduce service provider bandwidth cost, it may be desirable to implement a dynamic decision as to what degree to replicate packets. Thus, for example, it may be desired to start with a given number (e.g., three (3) copies) and then reduce this number dynamically if the loss/latency is acceptable.

Generalizing, the overlay mechanism as described about may be generalized as a routing "cloud" in which the arbitrary data flows are implemented intelligently. Within the cloud, and using the above-described transport techniques, the data may pass through one or more intermediate nodes, be transmitted along redundant paths, employ TCP or UDP as a transport mechanism, obey flow or class specific logic for determining optimality in a multidimensional parameter space, or any combination thereof.

Based on the architecture and billing model employed, a local controller or "knob machine" may be employed at the overlay ingress points. The motivation for this element is that bandwidth flowing to the cloud and within the cloud has an inherent cost. In some cases (e.g., all VPN traffic is being handled) it would not make sense for all of this traffic to flow to the cloud because at minimum the cost basis for the solution is twice the alternative. Thus, the purpose of the controller is to provide a simple and effective means of supplying the system with cost/benefit tradeoff business logic. (As such, the box is effectively a knob controlling how aggressively the system is used—hence the name.) Based on the rules supplied, the controller makes a decision on a per packet or per flow basis as to whether or not the traffic should be sent through the cloud or directly to the other end point. By default, preferably all traffic would flow through the controller. However, the controller would be configurable so as to employ appropriate business logic to decide when a flow should be sent to the cloud. This information may also affect the behavior that occurs within the cloud as well.

The rules that could be employed by the controller are quite flexible. They include selecting traffic based on: domain (e.g., Intranet traffic is important but a given content provider is not), IP Address (e.g., important to route traffic to the Tokyo office but not necessarily Chicago), performance predictions (e.g., the controller can understand various QoS metrics about the direct and alternate paths using the parent servers and chose to direct the traffic if the predicted improvement is greater than a given threshold and/or if the direct path's quality is below a certain threshold), reliability predictions (e.g., the controller can understand various reliability metrics about the direct and alternate paths and chose to use an alternate path through a parent server for the traffic if the predicted improvement is greater than a given threshold and/or if the direct path's quality is below a certain threshold), or the like. Of course, these rules are more powerful when used together. For example, one could choose to set the performance and reliability metrics differently for different domains.

Thus, path optimization is the general idea of getting a data packet from one node to another via a CDN region based on performance data that has been collected over time. This technique, as described above, has been used to improve connectivity back to a customer origin server for HTTP traffic. Moreover, the ability to tune the service feature so that the feature is invoked preferably when it can improve performance enough (e.g., latency reduced by x %). According to the present invention, the content delivery network is viewed as a "cloud" into which data flows may enter, get optimally directed across the "middle" (e.g. by the optimization technique), and appear on the other side as well as possible on their way to their destination. For example, consider the case of VPN traffic coming out of an office on the East Coast (e.g., Cambridge) on its way to an office in California (e.g., in San Mateo). Instead of just using BGP, the present invention may direct this traffic as an "entry point." This traffic then flows through the network, taking the appropriate number of bounces, and then exits the network at an "exit point" near the appropriate office. In a particular implementation, a controller is placed at the Cambridge office through which all traffic flows. This controller is used to decide, in real-time based on both business rules (e.g., traffic to a first domain is important but traffic to a second domain is not) and quality-of-service (QoS) rules (e.g., use the alternate path only if there is no direct path or if the alternate path is some % better). Of course, these examples do not limit the present invention.

Although not meant to be limiting, the controller machine can be implemented in an edge or ISP network. Several potential applications are now described.

Web Transactions

Entities that provide secure transactions on the Web may use the present invention to improve the reliability and performance of those transactions. One example would be a provider of online credit card transactions. Transactions are appealing both because they are by definition not cacheable and, moreover, because each request is valuable. The present invention can facilitate Web transactions by simply adding HTTPS support to the edge server optimization technique. In this context, CDN regions that support secure content (e.g., via SSL) can be view as "entry points" to the HTTPS routing cloud, with the connections to the origin or through the network being provided accordingly. In essence, the HTTP edge server implementation is extended into the generalized cloud, where every edge region can serve as an entry point and where a certain set of regions (e.g., parent regions) can serve as exit points.

Another area of applicability is that fact that both the secure and HTTP clouds support all SOAP-based transactions inasmuch as SOAP is implemented in HTTP. Thus, the present invention can be used to implement SOAP-based Web transactions.

VPN QoS

Another opportunity for valuable flows lies in the realm of VPNs. VPN traffic has the two attractive properties of being associated with information that the business finds valuable and also by definition flowing between two geographically disparate locations. The simple idea is to see VPN traffic as an encrypted IP data stream with end-to-end semantics behind the firewalls. Thus, it is possible to provide a UDP-based transport mechanism through the cloud. Most likely, the traffic would flow transparently through a knob machine and directed into the cloud appropriately. In this fashion, all traffic on the VPN will benefit from the service based on the knob settings.

This technique also is compatible with enterprise content delivery network offerings. With an enterprise CDN and the cloud, the CDN service provider can improve the performance and reliability of every piece of data in the company if the company has a VPN-based architecture. For example, all VoD content and cacheable web content may be cached in the customer's office. However, live streaming cannot be cached. The enterprise CDN can rate limit the traffic to protect finite resources. The cloud provides the redundancy and retransmits to improve the quality of these streams. In addition, other data flows, such as P2P videoconferencing, database synchronization, and the like, can benefit from this functionality.

Web Service Networks

As web services become more widely accepted, one of the key weaknesses of the systems will be the messaging that occurs between them. While there are several protocols being developed to support this functionality (SOAP, UDDI, etc.) there are two missing ingredients. The first is a set of application layer functionality, such as security, queuing, and non-repudiation/logging. The second is a transport mechanism for these messages.

One of ordinary skill will appreciate that the above-described overlay technologies are advantageous as they determine the entire outbound and inbound routes for a given communication using the BGP routing layer as a black box, and hence are not susceptible to BGP-related issues.

One of ordinary skill in the art will recognize that the present invention facilitates Layer 3 general purpose routing of IP traffic within a distributed, potentially global computer network for increased performance and reliability, perhaps dependant on application specific metrics. The system will accept arbitrary IP flows and will route them through the content delivery network to attempt achieve a set of metrics, e.g., metrics established by metadata. The metadata could be applied in a number of ways based on such properties as the source, destination, flow, application type, or the like. To achieve these metrics, the system also could decide to route the traffic on a per-hop and per-packet basis along an alternate route and/or multiple routes.

The invention claimed is:

1. A method of providing a plurality of client machines remote access to an application executing on a target server, wherein each client machine communicates with the application over the Internet using Internet Protocol (IP) transport, comprising:

establishing an overlay network, the overlay network comprising at least one or more edge regions, a set of intermediate regions, and one or more gateway regions, wherein each edge region, each intermediate region, and each gateway region comprises one or more servers that receive and process communications over IP;

for each client machine, and upon DNS resolution of a hostname associated with the application, associating each such client machine with a virtual IP address associated with a given server in a given edge region;

at the given server within the given edge region:

for each IP-based request data packet to be communicated between the client machine and the application, encapsulating the request data packet, duplicating the request data packet as encapsulated, and forwarding the request data packet as encapsulated to a given server at a gateway region, wherein the request data packet is forwarded to the given server at the gateway region over each of a set of paths that include at least one intermediate region, the set of paths including at least first and second paths from the given edge region to the gateway region that do not share a same intermediate region;

at the given server within the gateway region, processing received data to recover the request data packet, applying a network address translation to the request data packet as recovered and forwarding the request data packet to the target server for further processing by the application, wherein the network address translation also applies a source NAT to the packet before it is forwarded to the target server and an IP response data packet to the request data packet is delivered through the overlay network to the server having the virtual IP address.

2. The method as described in claim 1 wherein the virtual IP address is obtained by having the client machine execute a query against the hostname.

3. The method as described in claim 2 wherein the hostname is obtained by aliasing a domain associated with the application.

4. The method as described in claim 3 further including the step of de-aliasing the domain associated with the application upon a given failure condition.

5. The method as described in claim 1 wherein the given edge region is a best performing edge region at the time of the DNS resolution.

6. The method as described in claim 1 wherein the network address translation performs a destination NAT that translates the virtual IP address to an IP address of the target server.

7. The method as described in claim 1 further including the steps of receiving the response data packet at the gateway, encapsulating the response data packet, duplicating the response data packet as encapsulated, and forwarding the response data packet as encapsulated over a set of paths.

8. The method as described in claim 7 further including the steps of:

at the server having the virtual IP address, processing received data to recover the response data packet, and forwarding the response data packet to the client machine.

9. The method as described in claim 1 wherein the first and second paths are identified as a function of byte load injected into the overlay network by one or more edge regions and load on at least one intermediate region.

* * * * *